(12) United States Patent
Lazzarini et al.

(10) Patent No.: US 10,695,800 B2
(45) Date of Patent: Jun. 30, 2020

(54) SIEVE BEND

(71) Applicant: Aqseptence Group Pty Ltd, Queensland (AU)

(72) Inventors: David John Lazzarini, Queensland (AU); Yusuf Cajee, Queensland (AU); Ian Robert Solomon, Queensland (AU)

(73) Assignee: Aqseptence Group Pty Ltd., Queensland (AU)

( * ) Notice: Subject to any disclaimer, the term of this patent is extended or adjusted under 35 U.S.C. 154(b) by 0 days.

(21) Appl. No.: 16/123,698

(22) Filed: Sep. 6, 2018

(65) Prior Publication Data

US 2019/0070636 A1    Mar. 7, 2019

(30) Foreign Application Priority Data

Sep. 6, 2017    (AU) ................................ 2017903598
May 4, 2018    (AU) ................................ 2018203109

(51) Int. Cl.
*B07B 1/12*    (2006.01)
*B07B 1/46*    (2006.01)
*B01D 29/01*    (2006.01)

(52) U.S. Cl.
CPC ............... *B07B 1/12* (2013.01); *B07B 1/46* (2013.01); *B07B 1/4609* (2013.01); *B01D 29/014* (2013.01)

(58) Field of Classification Search
CPC ........... B07B 1/12; B07B 1/4609; B07B 1/46; B01D 29/014; B01D 29/90
See application file for complete search history.

(56) References Cited

U.S. PATENT DOCUMENTS

| 3,835,999 | A | * | 9/1974 | Moore | B01D 35/28 209/251 |
| 3,859,713 | A | * | 1/1975 | Fiedler | B01D 35/28 29/423 |
| 3,929,647 | A | * | 12/1975 | Kempa | B07B 1/12 209/395 |
| 4,422,937 | A | * | 12/1983 | Connolly | B01D 35/28 209/264 |
| 5,094,360 | A | * | 3/1992 | Lange | B01D 29/13 220/485 |
| 5,246,579 | A | * | 9/1993 | Probstmeyer | B01D 29/071 210/232 |
| 8,297,445 | B2 | * | 10/2012 | Maurais | B01D 29/445 209/305 |
| 2006/0289686 | A1 | * | 12/2006 | Cox | B07B 1/12 241/68 |
| 2014/0262978 | A1 | * | 9/2014 | Wojciechowski | B07B 1/469 209/397 |

\* cited by examiner

*Primary Examiner* — Charles A Fox
*Assistant Examiner* — Kalyanavenkateshware Kumar
(74) *Attorney, Agent, or Firm* — Patterson Thuente Pedersen, P.A.

(57) ABSTRACT

A sieve bend can include a support structure supporting a screening arrangement. The screening arrangement can include a first screening segment having a first screening element configuration and at least one further screening segment having a second screening element configuration different from the first screening element configuration.

8 Claims, 4 Drawing Sheets

SIEVE BEND

CROSS-REFERENCE TO RELATED APPLICATIONS

The present application claims priority from Australian Provisional Patent Application No 2017903598 filed on Sep. 6, 2017 and Australian Patent Application No. 2018203109 filed on May 4, 2018, the contents of both of which are incorporated herein by reference in their entirety.

TECHNICAL FIELD

This disclosure relates, generally, to screening equipment and, more particularly but not necessarily exclusively, to a sieve bend for use in dewatering and/or classification applications.

BACKGROUND

Sieve bends are used to separate solids from a carrier medium in a slurry flowing over a screening surface of the sieve bend. The sieve bend is often arcuate and is arranged at an incline with screening apertures, or slots, perpendicular to a direction of flow of the slurry over the screening surface of the sieve bend. As the slurry flows over the inclined screening surface, solids are retained on, and pass along, the screening surface while liquid and other entrained particles of the carrier medium as well as undersized particles pass through the screening slots of the sieve bend. The separated solids retained on the screening surface are fed downstream for further processing and/or collection while the separated carrier medium is able to be recycled for re-use.

The carrier medium used in mineral processing applications is generally in the form of magnetite media which is introduced into the mineral handling and preparation circuit to provide appropriate density to volumetric flow. This provides an ability to separate size-specific particles by density due to cyclonic action generated within an upstream separation asset. The cost of this magnetite media is high and recovery of the carrier medium plays a critical part in classifying ores.

It will be appreciated that inefficient media recovery results in significant losses for a mining operation. Recovery of the carrier medium is directly related to the open area of the sieve bend. The greater the open area, the better the efficiency of the sieve bend. However, it is desirable to increase open area without increasing slot size. An increased slot size is undesirable as it would result in larger particles passing through the screening slots resulting in an excessive proportion of recoverable solids being lost.

Another major consideration in mining operations is the cost of the sieve bends themselves. It will be appreciated that the slurry is very abrasive and the slurry impacting on the screening surface of the sieve bend adversely affects the operating life of the sieve bend. Extending the wear life of the sieve bend without adversely impacting screening efficiency could result in significant cost savings for the mining operation.

Any discussion of documents, acts, materials, devices, articles, or the like which has been included in the present specification is not to be taken as an admission that any or all of these matters form part of the prior art base or were common general knowledge in the field relevant to the present disclosure as it existed before the priority date of each of the appended claims.

SUMMARY

In some embodiments of the disclosure, there is provided a sieve bend which includes
  a support structure; and
  a screening arrangement supported by the support structure, the screening arrangement comprising
    a first screening segment having a first screening element configuration; and
    at least one further screening segment having a second screening element configuration different from the first screening element configuration.

Each screening segment may comprise a plurality of elongate screening elements arranged in spaced parallel relationship to define spaced, parallel screening slots.

The first screening segment may comprise screening elements of a first width and the at least one further screening segment may comprise screening elements of a second width, greater than that of the screening elements of the first screening segment. The screening slots of the first screening segment may be of substantially the same width as the screening slots of the at least one further screening segment.

A screening slot at a junction between the first screening segment and the at least one further screening segment may have a width falling within a range of from approximately 0 mm to the same width as the screening slots of the screening segments.

In an embodiment, the sieve bend may include two further screening segments, the two further screening segments being arranged on opposed sides of the first screening segment. The two further screening segments may have the same second screening element configuration as each other.

The at least one further screening segment may be treated to provide increased wear resistance. The at least one further screening segment may be treated by being coated with a wear resistant coating. For example, the screening elements of the at least one further screening segment may be hard chromed to provide increased wear resistance.

The support structure may be an arcuate support structure with the screening arrangement defining a correspondingly arcuate screening surface.

The disclosure extends to screening apparatus which includes
  a cradle;
  a feed hopper arranged at an upstream end of the cradle; and
  a sieve bend, as described above, mounted in the cradle.

Throughout this specification, the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

An embodiment of the disclosure is now described by way of example with reference to the accompanying drawings in which.

DETAILED DESCRIPTION OF EXEMPLARY EMBODIMENTS

Figure 1:
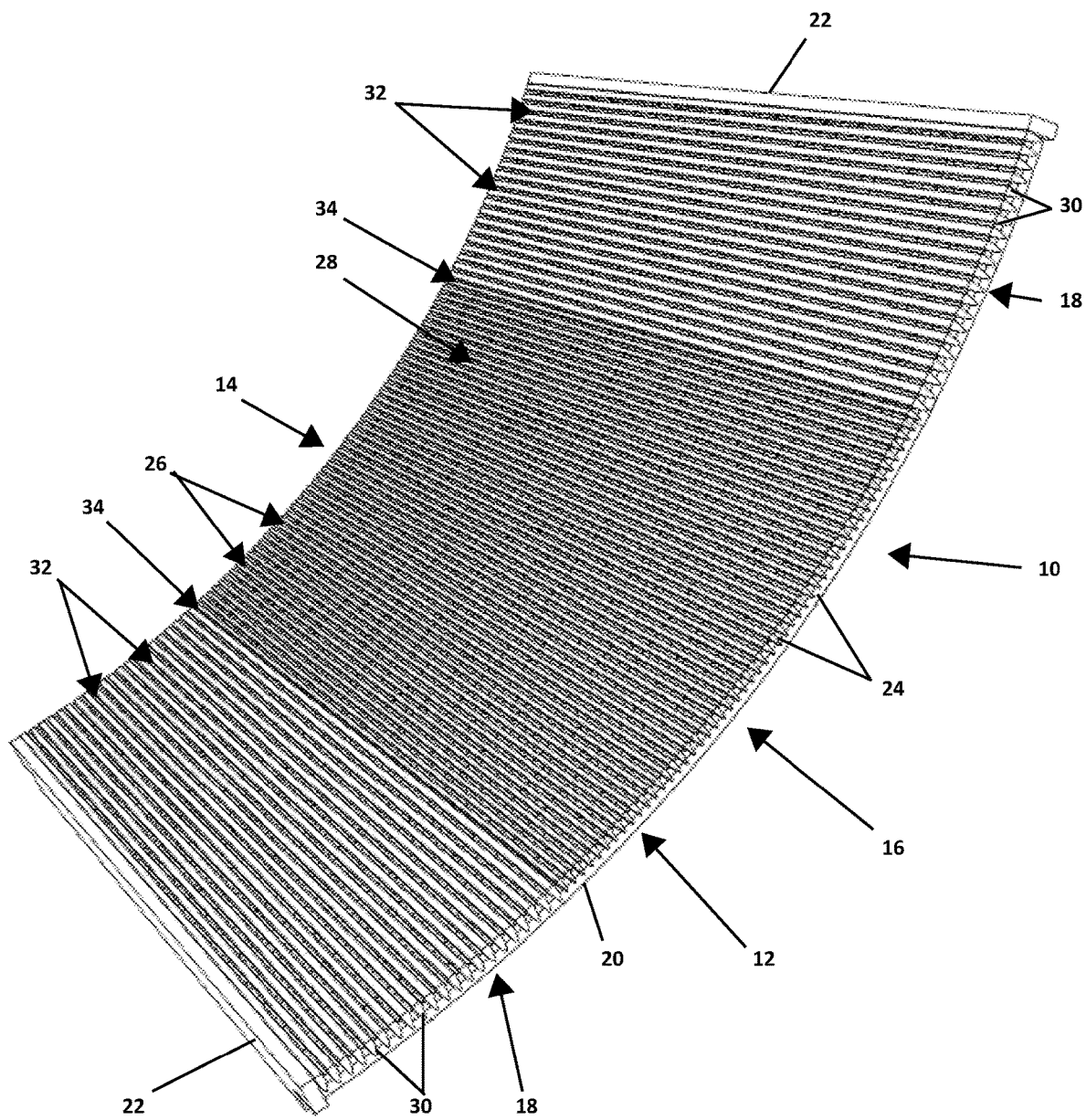
FIG. 1 shows a perspective view of an embodiment of a sieve bend.
Figure 2:
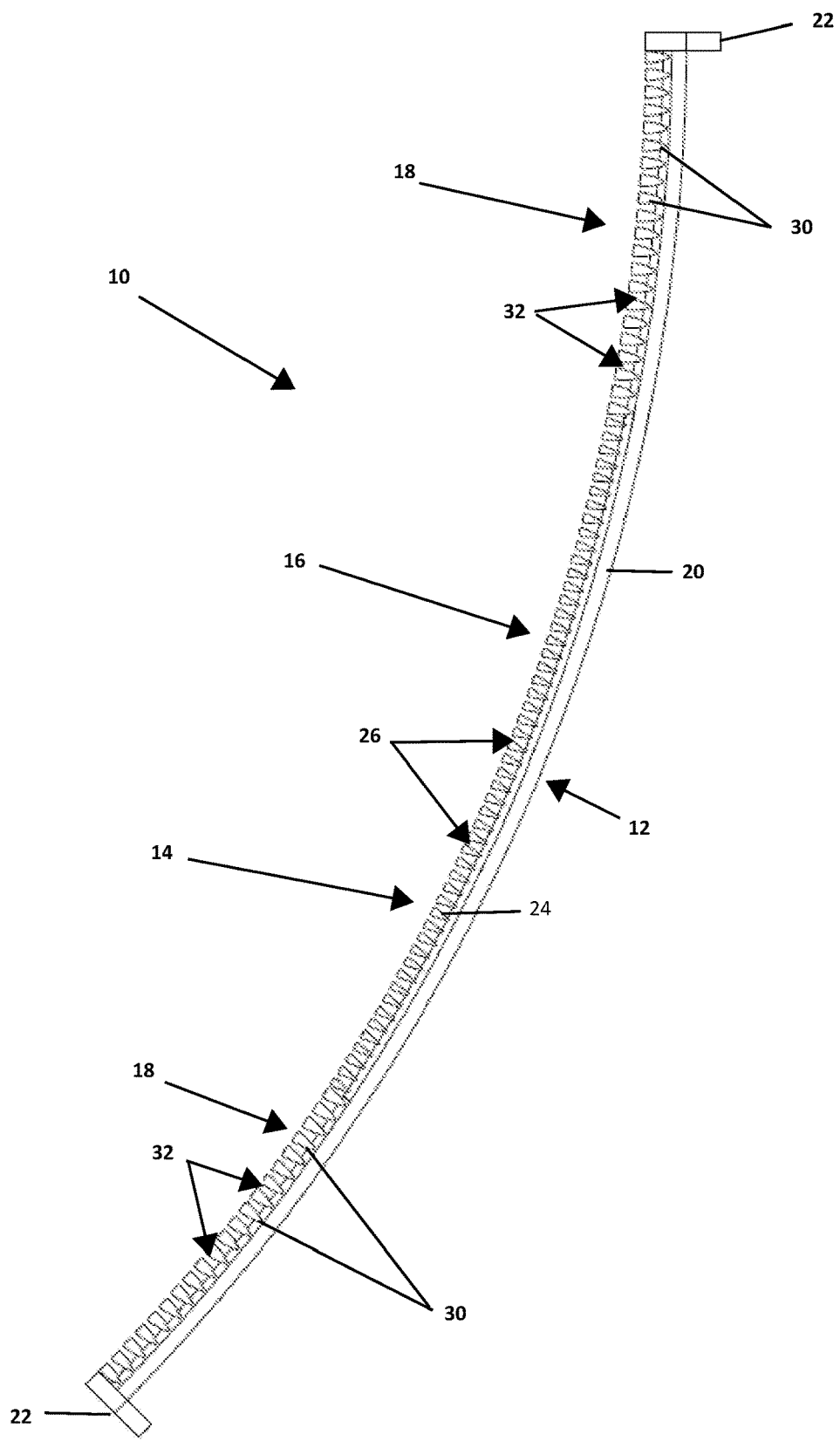
FIG. 2 shows a side view of the sieve bend.

In the drawings, reference numeral 10 generally designates an embodiment of a sieve bend. The sieve bend 10 includes an arcuate support structure 12 which supports a screening arrangement 14 defining an arcuate screening surface 28. The screening arrangement 14 comprises a first screening segment 16 having a first screening element configuration and, in the illustrated embodiment, at least two further screening segments 18, the screening segments 18 being arranged on opposed sides of the first screening segment 16. Each further screening segment 18 has a second screening element configuration different from the first screening element configuration.

The support structure 12 comprises a plurality of spaced, parallel support bars 20, one of which is shown in FIG. 1 of the drawings. The support bars 20 are held between end plates 22 defining ends of the sieve bend 10.

The screening segment 16 comprises a plurality of screening elements 24 arranged in spaced parallel relationship to define a plurality of spaced, parallel screening apertures, or slots, 26 which, in use, are arranged perpendicular to a direction of flow of slurry over a screening surface 28 (FIG. 1) of the screening arrangement 14. Each screening slot 26 has a width dimension 'w' (FIG. 3).

Figure 3:
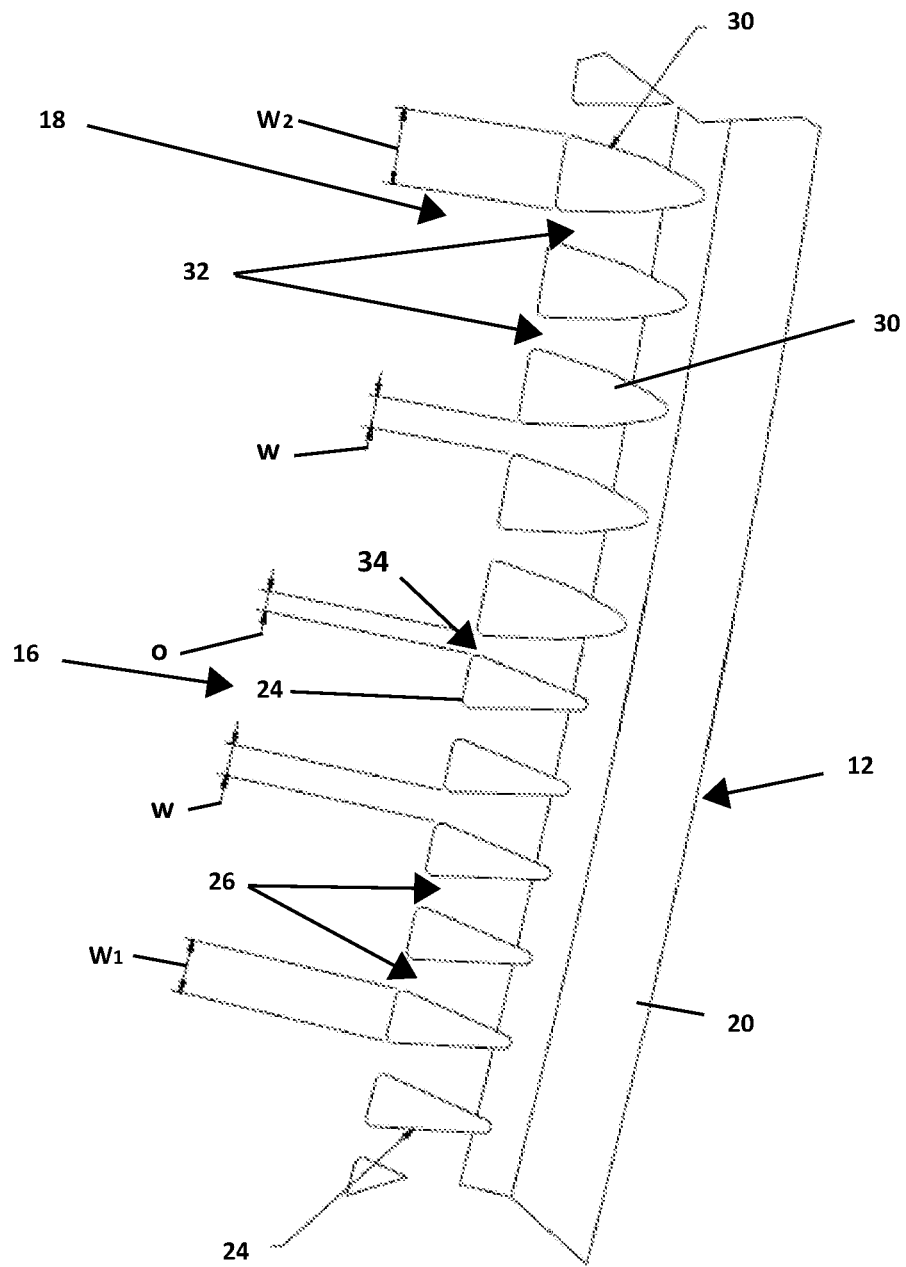
FIG. 3 shows, on an enlarged scale, a side view of a part of the sieve bend.

Each screening element 24 is in the form of a length of Vee-Wire® (Vee-Wire is a Registered Trade Mark of Johnson Screens, Inc. of 2000 St James Place, Houston, Tex., 77056, USA) of a first head width '$W_1$' (FIG. 3).

Each screening segment 18 comprises a plurality of screening elements 30, each of which is also in the form of a length of Vee-Wire®. The screening elements 30 are arranged in spaced parallel relationship to define a plurality of similarly spaced, parallel screening apertures, or slots, 32. Once again, the screening slots 32 are arranged, in use, perpendicular to the direction of flow of slurry over the screening surface 28 of the screening arrangement 14. In an embodiment, the screening slots 32 have the same width dimension 'w' as the screening slots 26 of the screening segment 16. However, each screening element 30 has a head width '$W_2$' (FIG. 3). The head width '$W_2$' of each screening element 30 of each screening segment 18 is greater than the head width '$W_1$' of each screening element 24 of the screening segment 16.

As an example only, the head width '$W_2$' of each screening element 30 of each screening segment 18 is about 3.3 mm and the head width '$W_1$' of each screening element 24 of the screening segment 16 is about 2.3 mm. The width 'w' of each screening slot 26, 32 is about 1.4 mm. It is to be noted that an opening 34 is provided between the screening segment 16 and each screening segment 18. This opening has a width, 'o' (FIG. 3), which may vary from about 0 mm to about 1.4 mm. These values are provided as examples only and it will be appreciated by those skilled in the art that the actual dimensions of the screening elements 24, 30 and screening slots 26, 32 will be dependent on the application of the sieve bend 10 and the slurry to be passed over the sieve bend 10.

The screening elements 24 and 30 of the screening segment 16 and 18, respectively, are made of a stainless steel. As an example, the screening elements 24 and 30 may be of a 304 grade stainless steel. Further, the screening elements 30 of the screening segments 18 are treated to provide increased wear resistance. More particularly, each screening segment 30 is coated with a wear-resistant coating. In an embodiment, the wear-resistant coating is a hard chrome.

A conventional sieve bend has screening elements all of the same head width. As an example, all the screening elements of the conventional sieve bend may have a head width of about 3.3 mm and screening apertures of about 1.4 mm. Such a conventional sieve bend provides a total screen open area of about 29.8%. In comparison with such a conventional sieve bend, the sieve bend 10 of the present disclosure, having the central screening segment 16 with screening elements 24 of narrower head width than the screening elements 30 of the adjacent screening segments 18, provides a total open screening area of approximately 33.6%. The screening segment 16, itself, has an open area of approximately 37.4%. As a result, the total open screening area of the sieve bend 10 is improved by approximately 12.8%.

In addition, the use of screening elements 30 of wider head width in the screening segments 18 upstream and downstream of the screening segment 16 results in improved impact resistance and, as a result, wear-resistance for those screening segments 18 in comparison with the screening segments 16. It will be appreciated that the upstream screening segment 18, in use, is subjected to higher impact than the remainder of the screening arrangement 14. As a result, the upstream screening segment 18 undergoes more rapid wear.

In addition, due to such impacts, the width of the screening slots 32 of the upstream screening segment may increase with use which, in turn, may adversely impact the classification efficiency of the sieve bend 10. By employing screening elements 30 of wider head width and by hard chroming the elements 30, this effect is mitigated to some extent thereby improving the classification efficiency of the sieve bend 10. Increasing the period of time for which the sieve bend 10 operates within specification, i.e. at the desired classification efficiency, results in greater cost savings for an operator.

Further, in use, by providing screening segments 18 on opposite sides of the screening segment 16, once the classification efficiency of the upstream screening segment 18 deteriorates, the sieve bend 10 can be rotated through 180° about an axis passing centrally through the sieve bend orthogonally to the screening elements 24, 30. What was then the downstream screening segment 18 becomes the upstream screening segment 18 and the life of the sieve bend 10 can be further prolonged in this manner.

Figure 4:
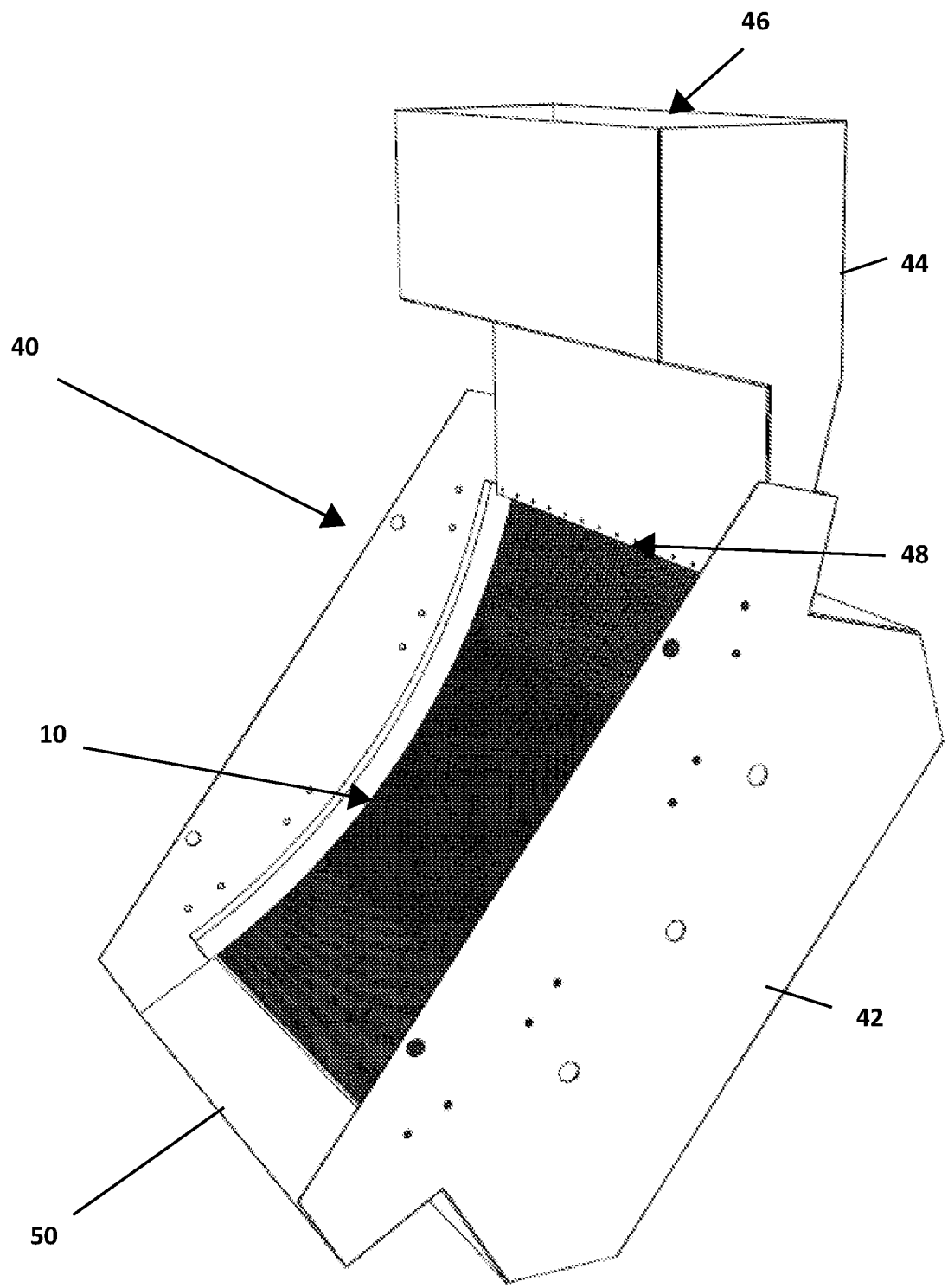
FIG. 4 shows a perspective view of a screening apparatus showing the sieve bend, in use.

Referring now to FIG. 4 the drawings, an embodiment of a screening apparatus is illustrated and is designated generally by the reference numeral 40. The screening apparatus 40 comprises a cradle 42 in which the sieve bend 10 is removably received, for use. A feed hopper or feed box 44 is arranged at an upstream end of the cradle 42.

The feed hopper 44 has an inlet opening 46 through which slurry (not shown) is received and a discharge opening 48 opening out on to an upstream end of the sieve bend 10 and, more particularly, on to the upstream screening segment 18 of the sieve bend 10. The slurry, as it is discharged from the feed hopper 44, flows over the screening surface 28 of the screening arrangement 14 of the sieve bend 10. The liquid, carrier medium of the slurry passes through the screening slots 26, 32 as do undersized particles. Oversized particles continue along the screening surface 28 of the screening arrangement 14 of the sieve bend 10 to be discharged over a downstream edge of the sieve bend 10 and a downstream end 50 of the cradle 42 of the screening apparatus 40.

Once the upstream screening segment 18 of the sieve bend 10 has worn beyond a threshold value, the sieve bend 10 is rotated through an angle of 180° about the axis passing through it so that the previously downstream screening segment 18 now becomes the upstream screening segment. This prolongs the life of the sieve bend 10.

In this regard, it will be noted that, when the initial upstream screening segment 18 is in the upstream position, the upstream, or leading, edge of each screening element 30 bears the greatest impact as slurry discharged from the discharge opening 48 of the feed hopper is moving at its highest velocity. This results in increased wear on the leading edge of each screening element 30 but there is less wear on the downstream, or trailing, edges of the screening elements 30 due to the trailing edges not being subjected to the same level of impacts.

It will also be appreciated that, as the slurry moves across the screening surface 28 of the sieve bend 10, its velocity reduces so that there is less wear on the screening elements 24 of the screening segment 16 as well as on the screening elements 30 of the downstream screening segment 18.

After rotation of the sieve bend 10, what was previously the trailing edge of the screening elements 30 of the previously downstream screening segment 18 become the leading edges of the screening elements 30 of the now upstream screening segment 18. Because there has been less wear on those edges, the screening slots 32 are more well-defined to the presented slurry thus substantially maintaining the classification efficiency of the upstream screening segment 18 of the sieve bend 10.

It is therefore an advantage of the described embodiments that a sieve bend 10 is provided having increased open area in comparison with conventional sieve bends per unit panel size. This results in increased media recovery while reducing media losses with the consequential cost savings for the mining operation.

In addition, by appropriate choice of head widths for the screening elements 24 and 30 of the screening segments 16 and 18, respectively, the classification efficiency of the sieve bend 10 is further improved. This is further enhanced by having the screening elements 30 of the screening segments 18 hard chromed to improve their wear resistance.

Still further, a nominal cut point of the screening segments 18 can be maintained for longer due to screening elements 30 of wider head width and their being treated for improved wear resistance.

In addition, by having two screening segments 18 on opposed sides of the screening segment 16, the life of the sieve bend 10 can be extended by simply rotating the sieve bend through 180°

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A sieve bend comprising:
   a support structure; and
   a screening arrangement defining a screen surface supported by the support structure, the screening arrangement comprising:
      a first screening segment having a first screening element configuration with screening elements of a first width; and
      at least one further screening segment having a second screening element configuration different from the first screening element configuration, the at least one further screening segment having screening elements of a second width, the second width being greater than the width of the screening elements of the first screening segment, each screening segment comprising a plurality of elongate screening elements arranged in spaced parallel relationship to define spaced, parallel screening slots with the screening slots of the first screening segment being of the same width as the screening slots of the at least one further screening segment to provide a substantially uniform slot width between an upstream end and a downstream end of the screening surface.

2. The sieve bend of claim 1 in which a screening slot at a junction between the first screening segment and the at least one further screening segment has a width falling within a range of from approximately 0 mm to the same width as the screening slots of the screening segments.

3. The sieve bend of claim 1 which includes two further screening segments, the two further screening segments being arranged on opposed sides of the first screening segment.

4. The sieve bend of claim 3 in which the two further screening have the same second screening element configuration as each other.

5. The sieve bend of claim 1 in which the at least one further screening segment is treated to provide increased wear resistance.

6. The sieve bend of claim 5 in which the at least one further screening segment is treated by being coated with a wear resistant coating.

7. The sieve bend of claim 1 in which the support structure is an arcuate support structure with the screening arrangement defining a correspondingly arcuate screening surface.

8. A screening apparatus comprising:
   a cradle;
   a feed hopper arranged at an upstream end of the cradle; and
   a sieve bend as claimed in claim 1 mounted in the cradle.

* * * * *